United States Patent [19]

Selvig

[11] Patent Number: 5,246,630
[45] Date of Patent: Sep. 21, 1993

[54] POLYMERIZABLE COMPOSITION

[75] Inventor: Christopher D. Selvig, Pittsburgh, Pa.

[73] Assignee: PPG Industries, Inc., Pittsburgh, Pa.

[21] Appl. No.: 7,218

[22] Filed: Jan. 22, 1993

Related U.S. Application Data

[62] Division of Ser. No. 911,422, Jul. 10, 1992.

[51] Int. Cl.$^5$ .............................................. G02B 5/23
[52] U.S. Cl. ..................................... 252/586; 524/710
[58] Field of Search .......................... 252/586; 524/710

[56] References Cited

U.S. PATENT DOCUMENTS

| | | | |
|---|---|---|---|
| 2,370,567 | 2/1945 | Muskat et al. | 525/61 |
| 2,403,113 | 7/1946 | Muskat et al. | 526/295 |
| 3,525,706 | 8/1970 | Calkins | 524/153 |
| 3,872,042 | 3/1975 | Bond | 524/710 |
| 4,360,653 | 11/1982 | Stevens et al. | 526/314 |
| 4,381,359 | 4/1983 | Idel et al. | 524/117 |
| 4,613,656 | 9/1986 | Tang | 526/193 |
| 4,637,698 | 1/1987 | Kwak et al. | 430/345 |
| 4,680,371 | 7/1987 | Rosenfeld | 528/179 |
| 4,686,266 | 8/1987 | Tang | 526/193 |
| 4,742,133 | 5/1988 | Tang et al. | 526/314 |
| 4,959,433 | 9/1990 | Oates et al. | 526/314 |
| 4,994,208 | 2/1991 | McBain et al. | 430/345 |
| 5,084,529 | 1/1992 | Crano | 525/455 |
| 5,110,881 | 5/1992 | McBain | 525/455 |

FOREIGN PATENT DOCUMENTS 0453149 of 0000 European Pat. Off. .
61-171709 of 0000 Japan .
50-22854 3/1975 Japan ................................. 524/153

OTHER PUBLICATIONS

"Statement of Qualifications and Experience, Soil Wash System", Geraghty & Miller, Inc. and Heidemij Restoffendiensten B.V.

Primary Examiner—Joseph L. Schofer
Assistant Examiner—N. Sarofim
Attorney, Agent, or Firm—George D. Morris

[57] ABSTRACT

The resistance to yellowing caused by post formation heating of a solid organic polymer produced by polymerizing a polymerizable composition comprising:

(a) from about 55 to about 89 percent by weight poly(allyl carbonate)-functional material selected from the group consisting of poly(allyl carbonate)-functional monomer, prepolymer of said monomer, and a mixture thereof;

(b) from about 10 to about 30 percent by weight vicinally aliphatic polyurethane having two ethylenically unsaturated terminal groups of which at least about 40 mole percent are allyl terminal groups; and (c) from about 0.05 to about 0.5 percent by weight organic pyrocarbonate selected from the group consisting of dialkyl pyrocarbonate, dicycloalkyl pyrocarbonate, bis(cycloalkylalkyl) pyrocarbonate, and a mixture thereof;

is enhanced by also including in the polymerizable composition from about 0.05 to about 0.5 percent by weight triphenyl phosphite.

17 Claims, No Drawings

POLYMERIZABLE COMPOSITION

This application is a divisional of application Ser. No. 07/911,422, filed Jul. 10, 1992.

The present invention relates to certain polymerizable compositions and to polymerizates prepared from such compositions. Such polymerizates, e.g., articles such as optical lenses, are characterized by an improved resistance to yellowing when heated at elevated temperature, e.g., at temperatures in the range of from about 80° C. to about 180° C.

Polymerizates prepared from aliphatic polyol(allyl carbonate) monomers, e.g., diethylene glycol bis(allyl carbonate), are characterized by hardness, impact resistance and optical clarity. For these reasons, optical articles, e.g., lenses, have been prepared from such polymerizates. Moreover, such lenses offer a weight advantage, vis a vis, glass lenses.

It has also been proposed to prepare photochromic articles from such polymerizates.

Photochromism is a phenomenon involving a change in color of a photochromic substance (or an article containing such a substance) when it is exposed to light radiation involving ultraviolet rays, such as ultraviolet radiation contained in sunlight or in the light of a mercury lamp, and a reversion to the original color when the influence of the ultraviolet radiation is discontinued, e.g., by storing the substance (or article) in the dark or removing the source of ultraviolet radiation. In recent years, photochromic plastic materials, particularly plastic materials for optical applications, have been the subject of considerable attention. In particular, photochromic ophthalmic plastic lenses have been investigated because of the weight advantage they offer, vis a vis, glass lenses. Moreover, photochromic transparencies for vehicles, such as cars and airplanes, have been of interest because of the potential safety features that such transparencies offer.

When incorporated within the matrix of a synthetic organic transparency (or applied to a substrate of such matrix), a photochromic substance changes color when exposed to ultraviolet light. This change in color reduces the amount of light transmitted through the transparency. It is desirable that the equilibrium response of the photochromic substance-containing transparency at all normal ambient temperatures, including relatively high ambient temperatures, e.g., temperatures on the order of 95° F. (35° C.), be significant.

It is reported in U.S. Pat. No. 4,994,208 that photochromic articles, e.g., transparencies, prepared from certain polymerizable polyol(allyl carbonate) compositions exhibit an improved photochromic equilibrium response compared to photochromic articles prepared from homopolymers of a polyol(allyl carbonate), such as diethylene glycol bis(allyl carbonate). This improved equilibrium response is suggested to be observable at temperatures of from 0° F. (−18° C.) to 115° F. (46° C.), e.g., from 30° F. (−1° C.) to 100° F. (38° C.), particularly over the ambient temperature range from about 55° F. (13° C.) to about 95° F. (35° C.). Such improvement in the photochromic response is described to be a result of an improvement in the coloring efficiency, i.e., the efficiency of the so-called coloring reaction, in polymerizates of such polyol(allyl carbonate) compositions.

More particularly, the polyol(allyl carbonate) compositions described in U.S. Pat. No. 4,994,208 comprise a mixture of a major amount of a polyol(allyl carbonate), e.g., diethylene glycol bis(allyl carbonate), and a minor amount of a certain urethane containing ethylenic unsaturation, e.g., acrylyl functional groups, at its terminal ends. Optionally, a small amount of a copolymerizable difunctional monomer, such as allyl methacrylate, may be added to the composition to enhance the hardness of the polymerizate prepared from the polyol(allyl carbonate) composition.

When subjected to heat aging or heat treatments, such as those involved in tinting of the polymerizate or imbibition of a photochromic substance by thermal transfer, polymerizates prepared from polyol(allyl carbonate) compositions containing a vicinally aliphatic polyurethane, tend to take on a slight yellow cast. Such yellowing may adversely affect the commercial utility of such polymerizates, particularly in optical applications, and may, if significant, adversely affect the optical transparency and clarity of articles prepared from such polymerizates. There is, therefore, a continuing need for materials that are compatible with the polymerizable composition and polymerizates prepared therefrom, which will prevent or mitigate yellowing of the polymerizate caused by heating at elevated temperatures, e.g. temperatures that may be used during post treatment of a pre-formed polymerizate. Such post treatment temperatures may range from about 80° C. to about 180° C., customarily from about 100° C. to about 150° C., e.g., 130° C.

U.S. Pat. No. 5,084,529 reports that the addition of small amounts of an organo pyrocarbonate to a polymerizable composition containing an aliphatic polyurethane component provides a polymerizate that exhibits enhanced resistance to yellowing caused by post formation heating.

It has now been discovered that the addition of small amounts of triphenyl phosphite [CAS 101-02-0] to polymerizable compositions comprising bis(allyl carbonate)-functional material, bis(ethylenically-terminated) vicinally aliphatic polyurethane, and organic pyrocarbonate, provides polymerizates that exhibit enhanced resistance to yellowing caused by post formation heating for a longer period of time. Accordingly, in a polymerizable composition comprising: (a) from about 55 to about 89 percent by weight poly(allyl carbonate)-functional material selected from the group consisting of poly(allyl carbonate)-functional monomer, prepolymer of such monomer, and a mixture thereof; (b) from about 10 to about 30 percent by weight vicinally aliphatic polyurethane having two ethylenically unsaturated terminal groups of which at least about 40 mole percent are allyl terminal groups; and (c) from about 0.05 to about 0.5 percent by weight organic pyrocarbonate selected from the group consisting of dialkyl pyrocarbonate, dicycloalkyl pyrocarbonate, bis(cycloalkylalkyl) pyrocarbonate, and a mixture thereof; the improvement wherein said polymerizable composition also comprises from about 0.05 to about 0.5 percent by weight triphenyl phosphite.

The poly(allyl carbonate)-functional material may be poly(allyl carbonate)-functional monomer, prepolymer of such monomer, or a mixture thereof. In most cases the poly(allyl carbonate)-functional material is bis(allyl carbonate)-functional material which may be bis(allyl carbonate)-functional monomer, prepolymer of such monomer, or a mixture thereof.

The amount of poly(allyl carbonate)-functional material present in the polymerizable composition of the invention can vary considerably. Most often the poly-(allyl carbonate)-functional material constitutes from about 55 to about 89 percent by weight of the polymerizable composition. Frequently the poly(allyl carbonate)-functional material constitutes from about 70 to about 84 percent by weight of the polymerizable composition. From about 75 to about 83 percent by weight is preferred.

The poly(allyl carbonate)-functional monomers are well known materials. Most commonly such monomers are polyol(allyl carbonate) monomers.

Polyol(allyl carbonate) monomers that may be used in the aforedescribed polymerizable composition are allyl carbonates of linear or branched aliphatic or aromatic liquid polyols, e.g., aliphatic glycol bis(allyl carbonate) compounds, or bisphenol bis(allyl carbonate) compounds. These monomers may be described as unsaturated polycarbonates of polyols, e.g., glycols and bisphenols. The monomers may be prepared by procedures well known in the art, e.g., as described in U.S. Pat. Nos. 2,370,567 and 2,403,113.

Polyol(allyl carbonate) monomers may be represented by the graphic formula:

R'—[—O—C(O)—O—R]$_m$    (I)

wherein R is the radical derived from an unsaturated alcohol and is commonly an allyl or substituted allyl group, R' is the radical derived from the polyol and m is a whole number from 2-5, preferably 2. The allyl group may be substituted at the 2-position with a halogen, most notably chlorine or bromine, or an alkyl group containing from 1 to 4 carbon atoms. Generally the alkyl substituent is a methyl or ethyl group. The allyl group may be represented by the graphic formula:

H$_2$C=C(R$_o$)—CH$_2$—    (II)

wherein R$_o$ is hydrogen, halogen or a C$_1$-C$_4$ alkyl group. Most commonly, R$_o$ is hydrogen and consequently R is the allyl group, H$_2$C=CH—CH$_2$—.

R' is a polyvalent radical derived from the polyol which can be an aliphatic or aromatic polyol that contains 2, 3, 4 or 5 hydroxy groups. Typically, the polyol contains 2 hydroxy groups, i.e., a glycol or bisphenol. The aliphatic polyol may be linear or branched and contains from 2 to 10 carbon atoms. Commonly, the aliphatic polyol is an alkylene glycol having from 2 to 4 carbons atoms or poly(C$_2$-C$_4$) alkylene glycol, e.g., ethylene glycol, propylene glycol, trimethylene glycol, tetramethylene glycol, or diethylene glycol, triethylene glycol, etc.

Specific examples of polyol(allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propane diol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and bisphenol A bis(allyl carbonate). Diethylene glycol bis(allyl carbonate) is the preferred polyol(allyl carbonate) monomer.

A detailed description of polyol(allyl carbonate) monomers that may be used to form the polymerizable composition of the present invention is found in U.S. Pat. No. 4,637,698 at column 3, line 33 through column 5, line 61. That disclosure is hereby incorporated by reference and is summarized above. As used in the present description and claims, the term polyol(allyl carbonate) monomer or like names, e.g., diethylene glycol bis(allyl carbonate), are intended to mean and include the named monomer and any related monomer or oligomer species contained therein.

Prepolymers of bis(allyl carbonate)-functional monomers and their preparation are well known. See, for example, U.S. Pat. Nos. 4,742,133; 4,959,433; and 5,017,666, the entire disclosures of which are incorporated herein by reference.

The polymerizable composition of the present invention usually contains from about 10 to about 30 weight percent of vicinally aliphatic polyurethane(s), at least about 40 mole percent of the terminal (or end) groups of which are allyl groups. By "vicinally aliphatic polyurethane" is meant polyurethane which is substantially free of carbamic nitrogen groups attached directly to aromatic groups. Often the polymerizable composition contains from about 15 to about 25 weight percent of the vicinally aliphatic polyurethanes. Preferably the polymerizable composition contains from about 16 to about 20 weight percent of the vicinally aliphatic polyurethanes. The vicinally aliphatic polyurethanes contemplated herein include bis(allyl-terminated) vicinally aliphatic polyurethane, mono(ally-terminated)-mono(acrylyl-terminated) vicinally aliphatic polyurethane, mixtures thereof, and mixtures of either or both with bis(acrylyl-terminated) vicinally aliphatic polyurethane. Bis(ethylenicaly-terminated) vicinally aliphatic polyesterurethanes and bis(ethylenically-terminated) vicinally aliphatic polyetherurethanes are within contemplation.

Often the vicinally aliphatic polyurethane comprises terminally unsaturated polyurethane represented by one or more of the formulae:

D—B—A—B—D    (III-1)

D—B—A—B—D'    (III-2)

wherein D represents the terminal functional group containing allyl unsaturation, D' represents the terminal functional group containing acrylyl unsaturation, A represents the residue of a saturated aliphatic polyol, and B represents a vicinally aliphatic bis carbamic moiety that originates from the corresponding vicinally aliphatic diisocyanate.

The polymerizable composition may also optionally comprise terminally-unsaturated vicinally aliphatic urethanes represented by the formula:

D'—B—A—B—D'    (III-3)

where D', A, and B are as previously discussed.

Group B in the foregoing graphic expressions may be represented herein by the formula, —OC(O)—NH-(E)NH—C(O)—O—, wherein E is the vicinally aliphatic (including cycloaliphatic) residue of the vicinally aliphatic diisocyanate.

Group A in the foregoing graphic expressions represents the residue of a saturated aliphatic polyol, e.g., diol, such as a C$_2$-C$_6$ alkane diol, diethylene glycol, a polyether diol, a polycarbonate diol or a polyester diol, i.e., the residue remaining after removal of the hydroxyl groups from the polyol, e.g., diol. For example, when the polyol is butane diol, A in the foregoing graphic expressions may be represented by the formula, $-CH_2-CH_2-CH_2-CH_2-$ (or $-(CH_2)_4-$). Preferably, A is the residue of a polyester diol, diethylene glycol, or $C_2-C_6$, e.g., $C_2-C_4$, alkane diol, e.g., butane diol.

The terminal group D in the foregoing expressions contains allyl unsaturation, and is preferably the allyl group, i.e., $CH_2=CH-CH_2-$, which originates, for example, from allyl alcohol.

The terminal group D', which contains acrylyl unsaturation, may contain acrylyl or methacrylyl unsaturation, i.e., $CH_2=C(L)-C(O)-$, wherein L is hydrogen or methyl. The terminal group D' may also be represented by the expression $CH_2=C(L)-C(O)-O-M-$, wherein M is an alkylene group of from 2 to 6 carbon atoms, such as ethylene, and L is hydrogen or methyl, e.g., the group derived from 2-hydroxyethyl acrylate or methacrylate. The term "acrylyl", when used in the description and claims in the generic sense, is intended to include "methacrylyl", i.e., when "L" is methyl.

Diisocyanates that may be used to prepare the vicinally aliphatic urethane component of the polymerizable composition include aliphatic diisocyanates, cycloaliphatic diisocyanates and tetramethyl xylene diisocyanate [CAS 2778-41-8]. For convenience and brevity, such isocyanates will be referred to collectively as vicinally aliphatic diisocyanates. Such materials are substantially free of isocyanato groups attached directly to aromatic groups. By substantially free of isocyanato groups attached directly to aromatic groups is meant that the vicinally aliphatic diisocyanate contains 1 percent or less of diisocyanato groups attached directly to aromatic groups. Thus the vincinally aliphatic urethane contains a correspondingly small, if any at all, amount of urethane groups the carbamic nitrogen atoms of which are attached directly to aromatic groups. Examples of suitable diisocyanates include 1,6-hexamethylene diisocyanate, 1,4-tetramethylene diisocyanate and 1,10-decamethylene diisocyanate, 4,4'-methylenebis(cyclohexyl isocyanate), 4,4'-methylene-bis(3-methyl cyclohexyl isocyanate), hydrogenated toluene diisocyanate (including hydrogenated products of: (a) the 2,4-isomer, (b) the 2,6-isomer, (c) the 80/20-2,4/2,6-isomer mixture and (d) the 65/35-2,4/2,6-isomer mixture), 4,4'-isopropylidene bis(cyclohexyl isocyanate), 1,4-cyclohexane diisocyanate, 4,4'-dicyclohexyl diisocyanate, 2,4'-dicyclohexyl diisocyanate, tetramethyl xylene diisocyanate, and 3-isocyanatomethyl-3,5,5-trimethylcyclohexane isocyanate. Preferably, the vicinally aliphatic diisocyanate is hydrogenated toluene diisocyanate or 3-isocyanatomethyl-3,5,5-trimethylcyclohexane isocyanate (isophorone diisocyanate).

As described, component A in the foregoing graphic expressions represents the residue, i.e., after removal of the terminal hydroxyl groups, of a saturated aliphatic polyol, e.g., diol, such as an alkane diol containing from 2 to 6, e.g., 2 to 4, carbon atoms, diethylene glycol, polyether diols, polycarbonate diols and polyester diols. Preferably, the aliphatic polyol from which the component A originates is a liquid at room temperature and is a polyester diol or alkane diol.

Polyester diols may be prepared by techniques well-known in the art, e.g., using saturated dicarboxylic acids or anhydrides thereof (or combination of acids and anhydrides) and polyhydric alcohols, or by ring opening of caprolactones, e.g., epsilon caprolactone, with a straight chain glycol, e.g., diethylene glycol. Such polyester diols and their manner of preparation are well known and are fully described in the published literature. Many are commercially available in various molecular weights. Aliphatic dicarboxylic acids suitable for preparing polyesters are those containing from about 4 to about 14, preferably from about 6 to about 10, carbon atoms inclusive. Examples of such dicarboxylic acids include: succinic acid, glutaric acid, adipic acid, pimelic acid, suberic acid, azelaic acid and sebacic acid. Corresponding anhydrides can also be used. Typically, adipic and azelaic acids are used.

The polyhydric alcohols used in the preparation of polyester diols are typically aliphatic alcohols containing at least 2 hydroxy groups, e.g., straight chain glycols containing from 2 to 15, preferably from 4 to 8, carbon atoms inclusive. More preferably, the aliphatic alcohols contain only 2 hydroxy groups. The glycols contain hydroxyl groups preferably in the terminal positions. Examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In preparing the polyester diol, the dicarboxylic acid (or anhydride thereof) is reacted with the polyhydric alcohol usually in the presence of a small amount of esterification catalyst, such as a conventional organo tin catalyst. The amount of acid and alcohol used will vary and depend on the polyester molecular weight desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4-butylene sebacate) and poly(epsilon caprolactone). Polyester diols contemplated for use may have a molecular weight average molecular weight from about 400 to about 2000, e.g., from about 400 to 1000, based on hydroxyl end group analysis of the polymer.

Polycarbonate diols that may be used to prepare the aliphatic urethane component of the polymerizable composition may have weight average molecular weights ranging from about 500 to about 5000, e.g., 550 to 3300, more particularly from 750 to 1500, as determined by hydroxyl end group analysis. Aliphatic polycarbonate diols are described in U.S. Pat. Nos. 3,248,414, 3,248,415, 3,248,416, 3,186,961, 3,215,668, 3,764,457 and 4,160,853. Such hydroxy-terminated polycarbonates may be prepared from (1) carbon dioxide and 1,2-epoxides, (2) cyclic carbonates, such as ethylene carbonate, or (3) from cyclic carbonates and 1,2-epoxides by methods known in the art. Polycarbonate diols may also be prepared by reacting aliphatic diols with bischloroformates of aliphatic diols in the presence of inert solvents and acid acceptors, e.g., tertiary amines. In addition, polycarbonate diols may be prepared from glycols, such as ethylene glycol, propylene glycol and diethylene glycol, and dialkyl carbonates, such as diethyl carbonate and dimethyl carbonate, by a transesterification reaction.

In particular, U.S. Pat. No. 4,160,853 describes the synthesis of aliphatic polycarbonate diols by the reaction of an aliphatic diol and a dialkyl carbonate in the presence of a titanium catalyst. The reaction sequence may be depicted by the following equation:

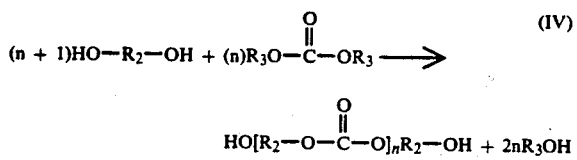

wherein n is a number from 4 to 46, $R_2$ is an aliphatic group (linear or cycloaliphatic) containing from 4 to about 10 carbon atoms, and $R_3$ is a lower alkyl group containing 1 to 4 carbon atoms. Preferred aliphatic diols include: 1,4-butane diol, and 1,6-hexane diol. Diethylcarbonate is a preferred dialkyl carbonate. The preferred catalysts are tetra-alkyl esters of titanium, particularly, tetrabutyl titanate. The disclosures of the aforedescribed patents relating to the preparation of aliphatic polycarbonate diols are hereby incorporated by reference.

Polyether diols, e.g., poly(oxyethylene)glycols, poly(oxy-1,2-propylene)glycols, and poly(oxy-1,4-butylene)glycol, that may be used to prepare the vicinally aliphatic polyurethane component of the polymerizable composition may also vary in molecular weight. Poly(oxyethylene)glycols may range in molecular weight from about 200-4000, more particularly, 750-3300, e.g., 1000-2800. Liquid poly(oxyethylene)glycols having molecular weights of below about 750, as determined by hydroxyl end group analysis, are particularly contemplated. Poly(oxyethylene)glycols may be prepared by reaction of ethylene oxide with water or ethylene glycol in the presence of a catalytic amount of a Lewis acid at 50°-70° C. or Lewis base at 120°-200° C.

Poly(oxypropylene)glycols may be prepared in a manner similar to poly(oxyethylene)glycols. Molecular weights of the poly(oxypropylene) glycols that may be used to prepare the aliphatic urethane of the polyol(allyl carbonate) composition may vary from about 400 to about 4000, e.g., 400 to about 2000, or 400 to about 1200, as determined by hydroxyl end group analysis. Liquid poly(oxypropylene)glycols are particularly contemplated.

In addition, block and random hydroxyl terminated copolymers of ethylene oxide and propylene oxide may be used. Further, polyether diols prepared from 1,2-butylene oxide, i.e., poly(oxy-1,2-butylene)glycol, and tetrahydrofuran are also contemplated.

Alkane diols contemplated for use in preparing the vicinally aliphatic polyurethane component of the polymerizable composition are alkane diols containing from 2 to 6 carbon atoms, e.g., ethylene glycol, propylene glycol, 1,4-butane diol, 1,5-pentane diol and 1,6-hexane diol. Preferably, the alkane diols contain terminal hydroxy groups.

The vicinally aliphatic polyurethane used to prepare the polymerizable compositions of the present invention may be prepared by methods derived from those described in the literature. For example, the vicinally aliphatic diisocyanate, e.g., isophorone diisocyanate, may be reacted with allyl alcohol at from 30°-60° C., e.g., 50°-60° C., in the presence of a conventional organo tin catalyst, e.g., dibutyl tin dilaurate, to form as a principal product the monoallyl alcohol substituted vicinally aliphatic isocyanate. Thereafter, two moles of the monoallyl alcohol substituted vicinally aliphatic isocyanate are reacted with saturated aliphatic diol, e.g., polyester diol and/or alkane diol, at about 60°-70° C. in the presence of the organo tin catalyst to form the allyl-terminated vicinally aliphatic polyurethane(s). As used herein, the phrase "containing terminal allyl unsaturation" with respect to the vicinally aliphatic polyurethane means that each terminal end of the polyurethane contains a functional group containing allyl unsaturation.

Vicinally aliphatic polyurethanes containing acrylyl unsaturation in the terminal group may be prepared in a manner analogous to that described for the allyl-terminated vicinally aliphatic polyurethane, e.g., by substituting a material containing the acrylyl functional group for allyl alcohol. Such a material may be 2-hydroxyethyl acrylate or 2-hydroxyethyl methacrylate. By reacting the monoallyl alcohol substituted vicinally aliphatic isocyanate and the mono (2-hydroxyethyl acrylate) substituted isocyanate (in whatever molar ratio desired for the end product mixture) with the saturated aliphatic diol, e.g., polyester diol and/or alkane diol, products containing both an allyl-containing terminal group and an acrylyl-containing terminal group may be obtained.

The vicinally aliphatic polyurethanes described herein may be prepared in any suitable organic solvent. In a preferred embodiment, the solvent is the polyol(allyl carbonate), e.g., diethylene glycol bis(allyl carbonate), with which the allyl-terminated vicinally aliphatic polyurethane is to be copolymerized.

When using the polyol(allyl carbonate) monomer as the reaction medium, the vicinally aliphatic polyurethanes may comprise from 10 to 70 percent of the product removed from the reaction vessel. If the vicinally aliphatic polyurethanes comprise an amount greater than the 10 to 30 weight percent desired for the polymerizable compositions described herein, the reaction product can be diluted with additional polyol(allyl carbonate) until the composition concentration desired is obtained.

Vicinally aliphatic polyurethanes containing terminal bisallyl-, monoallyl/monoacrylyl, and bisacrylyl functional groups may be further depicted by the following graphic formulae:

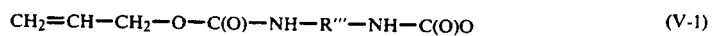
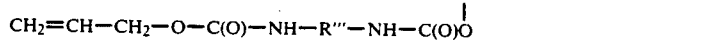

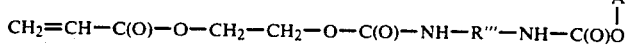

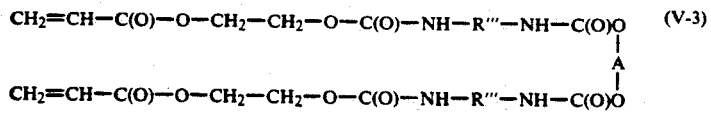

$$CH_2=CH-C(O)-O-CH_2-CH_2-O-C(O)-NH-R'''-NH-C(O)O \quad\quad (V-3)$$
$$\hspace{8cm} |$$
$$\hspace{8cm} A$$
$$\hspace{8cm} |$$
$$CH_2=CH-C(O)-O-CH_2-CH_2-O-C(O)-NH-R'''-NH-C(O)O$$

wherein A is the residue of the aliphatic polyol, e.g., polyester diol or alkane diol, and R''' is the hydrocarbon portion of the vicinally aliphatic diisocyanate. By selecting A and R''' from the examples described hereinbefore, the vicinally aliphatic polyurethane can be varied to provide different allyl/acrylyl-terminated vicinally aliphatic polyurethanes.

Organo pyrocarbonates that may be used to enhance resistance to yellowing of polymerizates prepared from polyol(allyl carbonate) monomer compositions containing an vicinally aliphatic polyurethane component may be represented by the graphic formula:

$$R-O-C(O)-O-C(O)-O-R \quad\quad (VI)$$

wherein R is selected from the group consisting of $C_1$–$C_{12}$ alkyl and $C_6$–$C_{10}$ cycloalkyl. Often R is selected from the group consisting of $C_2$–$C_4$ alkyl, such as ethyl, propyl and butyl. As used in the description and claims, the term "alkyl" when referring to dialkyl pyrocarbonates is intended to mean and include both linear and branched chain alkyls.

Suitable examples of dialkyl pyrocarbonates that may be used with polyol(allyl carbonate) compositions include: dimethyl pyrocarbonate [CAS 4525-33-1], diethyl pyrocarbonate [CAS 1609-47-8], diisopropyl pyrocarbonate, di-n-propyl pyrocarbonate, di-n-butyl pyrocarbonate, di-isobutyl pyrocarbonate, di-secondary butyl pyrocarbonate, di-tertiary-butyl pyrocarbonate [CAS 24424-99-5], diamyl pyrocarbonate, di-tertiary-amyl pyrocarbonate [CAS 68835-89-2], dihexyl pyrocarbonate, diheptyl pyrocarbonate, di-2-ethylhexyl pyrocarbonate, dinonyl pyrocarbonate, didecyl pyrocarbonate, and didodecyl pyrocarbonate. Examples of dicycloalkyl pyrocarbonates include dicyclohexyl pyrocarbonate and dicyclooctyl pyrocarbonate. An example of a bis(cycloalkylalkyl) pyrocarbonate is di-4-tertiary butyl cyclohexyl pyrocarbonate. Economically preferred are dimethyl pyrocarbonate and diethyl pyrocarbonate.

The organic pyrocarbonates may be prepared by reacting alkali metal organic carbonate, e.g., sodium ethyl carbonate, with organic halocarbonate, e.g., ethyl chlorocarbonate (ethyl chloroformate). The organo groups of the organic carbonate and halocarbonate are chosen to correspond to the organo groups desired for the pyrocarbonate. For example, sodium ethoxide, which can be prepared by dissolving sodium metal in a toluene solution of ethyl alcohol, is carbonated with carbon dioxide to prepare sodium ethyl carbonate. Thereafter, the sodium ethyl carbonate is reacted with ethyl chloroformate to form diethyl pyrocarbonate and sodium chloride. The chloride salt is filtered and the pyrocarbonate recovered by distillation.

Organic pyrocarbonates may also be prepared by reacting organic halocarbonate, e.g., ethyl chloroformate, with sodium hydroxide in the presence of a catalyst of a tertiary amine or quaternization product thereof having at least one omega-hydroxyalkyl, omega-hydroxyalkyl ether, or omega-hydroxyalkyl polyether group connected to the nitrogen atom. See, for example, Example 6 of U.S. Pat. No. 3,326,958.

In a preferred embodiment, the organic pyrocarbonate incorporated into the polymerizable polyol(allyl carbonate) composition is a colorless material that is soluble in the polyol(allyl carbonate) monomer composition. More preferably, the organic pyrocarbonate is a liquid that can be readily poured and admixed with the polymerizable components of the polyol(allyl carbonate) composition.

The amount of organic pyrocarbonate incorporated into the polymerizable composition may vary. Only that amount which is sufficient to enhance the resistance to yellowing from externally applied heat of polymerizates prepared from such compositions is required. Such amount may be referred to as a heat-stabilizing amount and will usually be in the range of from about 0.05 to about 0.5 percent by weight of the polymerizable composition. In many instances the amount of organic pyrocarbonate is in the range of from about 0.05 to about 0.4 weight percent. From about 0.1 to about 0.3 weight percent is preferred. The organic pyrocarbonate is incorporated into the polymerizable liquid composition by admixing the selected amount with mild agitation until the pyrocarbonate is dissolved in the polymerizable composition.

The amount of triphenyl phosphite present in the polymerizable composition of the invention may also vary. Only that amount which is sufficient to further enhance the resistance to yellowing from externally applied heat of polymerizates prepared from such compositions is required. Such amount may be referred to as a further heat-stabilizing amount and will usually be in the range of from about 0.05 to about 0.5 percent by weight of the polymerizable composition. Often the amount of triphenyl phosphite is in the range of from about 0.05 to about 0.4 weight percent. From about 0.1 to about 0.3 weight percent by weight is preferred. The triphenyl phosphite is incorporated into the polymerizable liquid composition of the invention by admixing the selected amount with mild agitation until the triphenyl phosphite is dissolved in the polymerizable composition.

The polymerizable composition of the present invention may be homogeneous or heterogeneous, but usually it is homogeneous.

Polymerization of the polymerizable composition may be accomplished by exposing the composition to ionizing radiation or actinic radiation, or by adding to the composition an initiating amount of material capable of generating free radicals, such as organic peroxy compounds and heating. Methods for polymerizing polyol(allyl carbonate) compositions are well known to the skilled artisan and any of those well known techniques may be used to polymerize the aforedescribed polymerizable composition. Suitable examples of organic peroxy compounds include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate, such as diisopropyl peroxydicarbonate.

The amount of initiator used to initiate and polymerize the polymerizable composition may vary and will depend on the particular initiator used, the make-up of the composition, e.g., the amount of allyl and acrylyl-functional groups present, and the degree of cure. Only that amount that is required to initiate and sustain the polymerization reaction is required, i.e., an initiating amount. With respect to the preferred peroxy compound, diisopropyl peroxydicarbonate, typically between about 2.4 and about 3.5 parts of that initiator per 100 parts of the polymerizable composition (phm) may be used. More usually, between about 2.75 and about 3.25 parts of that initiator per 100 parts of polymerizable composition is used to initiate the polymerization. The amount of initiator and the consequent cure cycle should be adequate to produce a polymerizate having a 15 second Barcol hardness of at least 10, preferably, at least 14, e.g., 10 to 35. Typically, the cure cycle involves heating the polymerizable composition in the presence of the initiator from room temperature or 45° C. to about 95°-105° C. over a period of about 17-21 hours. The surface of the cured matrix should not be so hard that, in one embodiment, imbibition of photochromic substances into the matrix by immersion or thermal transfer is inhibited or prevented if that method of incorporating the photochromic substance is used. In one embodiment, the polymerizate is slightly undercured to enhance permeation of the photochromic substance.

Various additives may be incorporated with the polymerizable composition. Such additives may include light stabilizers, heat stabilizers, polymerization inhibitors, and ultraviolet light absorbers. In addition, it is contemplated that a form of photochromic substance resistant to the effects of the peroxy-type initiator may also be added to the polymerizable composition. Such photochromic substances include photochromic pigments and photochromic compounds encapsulated in metal oxides, the latter of which is such as described in U.S. Pat. Nos. 4,166,043 and 4,367,170.

The polymerizable composition may be prepared by admixing the various ingredients.

The synthetic organic polymerizate obtained by polymerization of the polymerizable composition will preferably be transparent or optically clear so that it may be used for optical lenses, such as plano and ophthalmic lenses, windows, automotive transparencies, e.g., windshields, T-roofs, sidelights and backlights, and for aircraft transparencies, etc. The polymerizate also should be transparent to that portion of the electromagnetic spectrum which activates photochromic substance(s) that may be incorporated in the matrix, i.e., that wavelength of ultraviolet (UV) light that produces the colored or open form of a photochromic substance and that portion of the visible spectrum that includes the absorption maximum wavelength of the photochromic substance in its UV activated form, i.e., the open form.

Since the polymerizable composition comprises from about 55 to about 89 weight percent polyol(allyl carbonate) the physical properties of the cured (polymerized) material of the present invention are similar to those obtained for homopolymers of the polyol(allyl carbonate) monomer, e.g., diethylene glycol bis(allyl carbonate). For optical applications, such properties include relatively low yellowness, low haze, adequate impact strength and hardness, suitable abrasion resistance for polymerizates of polyol(allyl carbonate), dyeability and organic solvent resistance. Such physical properties are described in "The Handbook of Plastic Optics", second edition, U.S. Precision Lens, Inc., Cincinnati, Ohio, 1983, which is incorporated herein by reference.

Photochromic articles described herein may be obtained by incorporating in or applying to the aforedescribed synthetic organic solid polymerizate (host material) at least one organic photochromic compound or compositions containing at least one organic photochromic compound (hereinafter collectively referred to as "photochromic substance(s)"). Incorporation or application of a photochromic substance to the host material may be accomplished by various methods described in the art. Such methods include dissolving or dispersing the photochromic substance within the plastic host, e.g., imbibition of the photochromic substance into the plastic host by immersion in a hot solution of the substance or by thermal transfer; providing the photochromic substance as a separate layer between adjacent layers of the host material, e.g., as part of a polymer film; and applying the photochromic substance as part of a coating placed on the surface of the host. The term "imbibition" or "imbibe" is intended to mean and include permeation of the photochromic substance alone into the subsurface of the synthetic plastic host material, solvent assisted transfer absorption of the photochromic substance into the polymerizate, vapor phase transfer and other such transfer mechanisms. The thermal transfer of photochromic substances into a transparent plastic host material is known to the skilled artisan and is described in the literature. See for example, U.S. Pat. Nos. 4,286,957 and 4,880,667, and copending U.S. patent application Ser. No. 07/490,029, filed Mar. 7, 1990, which are incorporated herein in toto by reference.

The amount of photochromic substance(s) incorporated into the synthetic plastic host may vary and will depend on the method of incorporation. Typically, a sufficient amount, i.e., a "photochromic amount", of the photochromic substance(s) is used so that the resulting article is photochromic, i.e., produces a photochromic effect. By "photochromic" or "photochromic effect" is meant that when the photochromic-containing article is exposed to ultraviolet light, the article visibly changes color (or becomes colored) and then returns to its original color or colorless state when the ultraviolet light is removed. The photochromic effect may be readily observed by exposing such a photochromic substance-containing article to a source of natural ultraviolet light, such as the sun, or to an artificial ultraviolet light source, such as a Spectroline Super ® Lamp, Model M ENF-28 (365 nanometers). Generally, the amount of photochromic substance(s) incorporated into the article may vary from about 0.01 to about 10 or 20 weight percent. More typically, the amount of photochromic substance(s) incorporated into the article may range from about 0.01 to about 2 weight percent, e.g., from about 0.05 to about 1 weight percent.

Photochromic substances that may be used to prepare the photochromic article of the present invention may be any suitable organic photochromic substance that provides a visual photochromic response when incorporated into the host material described herein; that are dispersible, e.g., soluble, within the host material, and that are chemically compatible with the host material. Photochromic substances that may be used are varied. Particularly contemplated classes of photochromic compounds that may be used include: spiro(indolino)-type compounds, such as spiro(indolino)pyridobenzoxazines, spiro(indolino)naphthoxazines, spiro(benzindolino)pyridobenzoxazines, spiro(benzindolino)naphthoxazines, spiro(benzindolino)naphthopyrans, spiro(indolino)benzopyrans, spiro(indolino)naphthopyrans, spiro(indolino)quinopyrans, spiro(indolino)benzoxazines, chromenes, i.e., benzopyrans and 2H and 3H naphthopyrans, metal dithizonate compounds, fulgides or fulgimides and spiro(di)hydroindolizines.

The particular photochromic substance(s) selected for use will depend on its compatibility with the host material, including its solubility therein, and the particular change in color desired for the photochromic article. It is also contemplated that mixtures of two or more photochromic substances may be used.

Photochromic compounds that may be utilized to prepare photochromic articles of the present invention are for the most part described in the open literature and are the subject of various patent publications. For example, spiro(indolino)naphthoxazines have been described, among others, in U.S. Pat. Nos. 3,562,172, 3,578,602, 4,215,010 and 4,342,668. Spiro(indolino)pyridobenzoxazines are described in U.S. Pat. No. 4,637,698. Spiro(benzindolino)pyridobenzoxazines and spiro(benzindolino)naphthoxazines are described in U.S. Pat. No. 4,931,218. Spiro(benzindolino)-naphthopyrans are described in Japanese patent publication 62/195383 and are represented by graphic formula VII

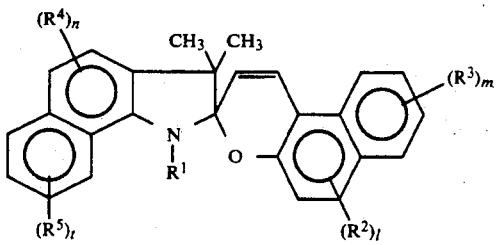

wherein $R^2$, $R^3$, $R^4$ and $R^5$ are alkyl groups having 1–4 carbons, halogen-substituted alkyl groups having 1 or 2 carbons, alkoxy groups having 1–4 carbons, halogen groups, or nitro group, l and n are integers of 0–2, m and t are integers of 0–4, and wherein $R^2$, $R^3$, $R^4$ and $R^5$ may be identical or different; $R^1$ represents an unsubstituted or substituted alkyl group having 1–20 carbons, unsubstituted or substituted cycloalkyl group have 3–10 carbons, an unsubstituted or substituted aralkyl group having 7–20 carbons, or an unsubstituted or substituted aryl group having 6–14 carbons.

Spiro(indolino)benzoxazines are described in U.S. Pat. No. 4,816,584. Spiro(indolino)benzopyrans, spiro(indolino)naphthopyrans and spiro(indolino)quinopyrans are described, for example, in U.S. Pat. No. 4,880,667. Spiropyrans are also described in the text, *Techniques of Chemistry*, Volume III Photochromism, Chapter 3, Glenn H. Brown, Editor, John Wiley and Sons, Inc. New York 1971.

Photochromic organo-metal dithizonates, i.e., (arylazo)thioformic arylhydrazidates, e.g., mercury dithizonates, are described in, for example, U.S. Pat. No. 3,361,706. Fulgides and fulgimides, e.g. the 3-furyl and 3-thienyl fulgides and fulgimides are described in U.S. Pat. No. 4,220,708. 3-Pyrryl fulgides and fulgimides are described in U.S. Pat. No. 4,737,449. Spiro(di)hydroindolizines are described, for example, in U.S. Pat. No. 4,931,220 at column 20, line 5 through column 21, line 38. Certain chromenes, i.e., benzopyrans and naphthopyrans, are described in U.S. Pat. Nos. 3,567,605, 4,826,977 and 4,980,089 and in copending U.S. patent applications Ser. Nos. 07/490,031 filed Mar. 7, 1990, 07/557,432 filed Sep. 23, 1990 and 07/624,816 filed Dec. 3, 1990.

Those portions of the aforementioned identified patent publications and applications that describe the various photochromic compounds generically and specifically are hereby incorporated in toto by reference. In particular, column 8, line 52, through column 22, line 40 of U.S. Pat. No. 4,931,220 which describes specific spiro(indolino)-type photochromic compounds and other photochromic compounds and the disclosure relating thereto is incorporated herein in toto by reference.

The present invention is more particularly described in the following examples, which are intended as illustrative only, since numerous modifications and variations therein will be apparent to those skilled in the art.

EXAMPLE 1

Preparation of Vicinally Aliphatic Polyurethane

An additive mixture was formed by admixing 261.2 grams of 2-hydroxyethyl acrylate [CAS 818-61-1] and 159.8 grams of allyl alcohol [CAS 107-18-6].

A 5-liter, jacketed, 4-necked flask with a bottom drop valve was equipped with a mechanical stirrer, a 1-liter graduated addition funnel, a thermometer, a stopper, and a water/ethylene glycol temperature control bath. The reactor was charged with 1224.8 grams of diethylene glycol bis(allyl carbonate) monomer, 1111.5 grams of isophorone diisocyanate [CAS 4098-71-9], 0.8 grams of dibutyltin dilaurate [CAS 77-58-7], and 0.753 gram 2,6-di-tert-butyl-4-methylphenol [CAS 128-37-0]. The charged materials were heated to 50° C. with rapid agitation. The above additive mixture was added in its entirety over a period of 2 hours from the addition funnel. During this period an exotherm to 56° C. was observed. Upon the completion of the addition, the temperature was increased to 60° C. an held at that temperature for one hour. Over a period of 5 hours 1325 grams of poly(ε-caprolactone)diol [CAS 25248-42-4] having an average molecular weight of 530 was added. During this period an exotherm to 62° C. was observed. Upon completion of the addition the reaction mixture was heated at 60° C. for one hour and then at 70° C. for 4 hours. The NCO/NH peak ratio of a sample of the resulting vicinally aliphatic polyurethane product was determined to be 0.0425 by infrared spectroscopy. The product was drained into a 3.8 liter (1 U.S. gallon, liquid) narrow mouthed glass bottle. Analytical results of the product were as follows:

| Appearance | Slightly Hazy, Light Straw Color |
|---|---|
| LVT Brookfield Viscosity at 25° C. (#31 spindle, small sample adapter, 3 revolutions/minute), centipoises | 9540 |
| Refractive Index, $n_D^{20}$ | 1.4822 |
| Transmittance (Hunter, 5 cm path), percent | 89.69 |

-continued

| Appearance | Slightly Hazy, Light Straw Color |
|---|---|
| Haze (Hunter, 5 cm path), percent | 32.04 |
| Yellowness Index (Hunter, 5 cm path) | 8.74 |
| Density at 25° C., g/mL | 1.13 |

EXAMPLE 2

Preparation of Polymerizable Compositions and Polymers

Three polymerizable compositions were prepared by admixing the various ingredients:

| Composition A | |
|---|---|
| Diethylene glycol bis(allyl carbonate) monomer | 80.74 wt % |
| Product of Example I | 18.96 wt % |
| Diethyl pyrocarbonate | 0.30 wt % |
| Composition B | |
| Diethylene glycol bis(allyl carbonate) monomer | 80.74 wt % |
| Product of Example I | 18.96 wt % |
| Triphenyl phosphite | 0.30 wt % |
| Composition C | |
| Diethylene glycol bis(allyl carbonate) monomer | 80.74 wt % |
| Product of Example I | 18.96 wt % |
| Diethyl pyrocarbonate | 0.20 wt % |
| Triphenyl phosphite | 0.10 wt % |

Each polymerizable composition was initiated with 2.70 parts of diisopropyl peroxydicarbonate [CAS 105-64-6], mixed, and poured into flat sheet molds of 152.4 mm × 304.8 mm × 6.35 mm and cured in an air oven using the cure cycle of Table 1.

TABLE 1

| Cure Cycle | |
|---|---|
| Cumulative Hours | Oven Temperature, °C. |
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of Cycle) |

The polymerizates were demolded. Ten 50.8 mm × 50.8 mm squares were cut from each polymerizate. Using a Spectrogard ® II Color Gard spectrophotometer, L*, a*, b*, Yellowness Index (YID), and Transmittance (T) were measured for each polymerizate in accordance with the Spectrogard ® II Color System operator's manual. The Absorbance at 346 nm (ABS) was measured for each polymerizate using a Varian/Cary 3 UV/Visual spectrophotometer. Five squares from each polymerizate were placed into a VWR 1620D air oven set at 135° C. One square from each polymerizate was removed hourly and measured for the same values using the same spectrophotometers as before. The results are shown in Table 2 as a function of time at 135° C. where the identities of the polymerizates are the same as those of the polymerizable solutions from which they were formed.

TABLE 2

| | | Optical Characteristics | | | | | |
|---|---|---|---|---|---|---|---|
| Polymerizate | Time, hr | L* | a* | b* | T, % | YID | ABS |
| A | 0 | 97.16 | −0.10 | 0.56 | 92.84 | 1.13 | 0.120 |
| A | 1 | 97.12 | −0.11 | 0.61 | 92.73 | 1.23 | 0.167 |
| A | 2 | 97.10 | −0.16 | 0.80 | 92.70 | 1.52 | 0.201 |
| A | 3 | 97.04 | −0.21 | 1.07 | 92.55 | 2.00 | 0.237 |
| A | 4 | 96.95 | −0.33 | 1.60 | 92.32 | 2.85 | 0.286 |
| A | 5 | 96.95 | −0.44 | 2.03 | 92.31 | 3.56 | 0.324 |
| B | 0 | 97.08 | −0.08 | 0.63 | 92.63 | 1.30 | 0.142 |
| B | 1 | 96.85 | −0.13 | 0.95 | 92.33 | 1.85 | 0.190 |
| B | 2 | 96.84 | −0.24 | 1.57 | 92.05 | 2.88 | 0.245 |
| B | 3 | 96.80 | −0.29 | 1.88 | 91.94 | 3.41 | 0.274 |
| B | 4 | 96.73 | −0.38 | 2.27 | 91.77 | 4.04 | 0.310 |
| B | 5 | 96.63 | −0.48 | 2.78 | 91.54 | 4.89 | 0.346 |
| C | 0 | 97.17 | −0.10 | 0.48 | 92.85 | 0.99 | 0.121 |
| C | 1 | 97.13 | −0.10 | 0.60 | 92.75 | 1.21 | 0.154 |
| C | 2 | 97.13 | −0.12 | 0.68 | 92.77 | 1.35 | 0.175 |
| C | 3 | 97.05 | −0.15 | 0.78 | 92.57 | 1.51 | 0.201 |
| C | 4 | 97.08 | −0.15 | 0.89 | 92.63 | 1.71 | 0.220 |
| C | 5 | 97.08 | −0.23 | 1.09 | 92.64 | 2.00 | 0.229 |

The data show that the values of a* and b* for Polymerizate C upon heat aging are closer to zero than those for either Polymerizate A or Polymerizate B. The data also show that the yellowness index of Polymerizate C, especially upon heat aging, is lower than the yellowness indices off either Polymerizate A or Polymerizate B. The data therefore show that Polymerizate C was much less colored upon heat aging than Polymerizate A or Polymerizate B.

Although the present invention has been described with reference to specific details of certain embodiments thereof, it is not intended that such details should be regarded as limitations upon the scope of the invention except insofar as they are included in the accompanying claims.

I claim:

1. A solid organic polymer prepared by polymerizing a polymerizable composition comprising:
   (a) from about 55 to about 89 percent by weight poly(allyl carbonate)-functional material selected from the group consisting of poly(allyl carbonate)-functional monomer, prepolymer of said monomer, and a mixture thereof;
   (b) from about 10 to about 30 percent by weight vicinally aliphatic polyurethane having two ethylenically unsaturated terminal groups of which at least about 40 mole percent are allyl terminal groups;
   (c) from about 0.05 to about 0.5 percent by weight organic pyrocarbonate selected from the group consisting of dialkyl pyrocarbonate, dicycloalkyl pyrocarbonate, bis(cycloalkylalkyl) pyrocarbonate, and a mixture thereof; and
   (d) from about 0.05 to about 0.5 percent by weight triphenyl phosphite.

2. The solid organic polymer of claim 1 wherein said poly(allyl carbonate)-functional material is bis(allyl carbonate)-functional material selected from the group consisting of bis(ally carbonate)-functional monomer, prepolymer of said monomer, and a mixture thereof.

3. The solid organic polymer of claim 1 wherein said poly(allyl carbonate)-functional material is polyol(allyl carbonate) monomer.

4. The solid organic polymer of claim 3 wherein said polyol(allyl carbonate) monomer is diethylene glycol bis(allyl carbonate) monomer.

5. The solid organic polymer of claim 1 wherein said vicinally aliphatic polyurethane comprises terminally unsaturated polyurethane represented by at least one of the formulae:

D—B—A—B—D

D—B—A—B—D' wherein D represents the terminal functional group containing allyl unsaturation, D' represents the terminal functional group containing acrylyl unsaturation, B is represented by the formula:

—OC(O)—NH(E)NH—C(O)—O— wherein E is the vicinally aliphatic residue of a vicinally aliphatic diisocyanate, and A represents the residue of a saturated aliphatic diol selected from the group consisting of $C_2$–$C_6$ alkane diol, diethylene glycol, polyester diol, and polyether diol.

6. The solid organic polymer of claim 5 wherein A represents the residue of a saturated polyester diol having a molecular weight of from about 400 to about 1000.

7. The solid organic polymer of claim 6 wherein said polyester diol is poly(caprolactone) diol.

8. The solid organic polymer of claim 5 wherein A represents the residue of a $C_2$–$C_6$ alkane diol.

9. The solid organic polymer of claim 8 wherein said $C_2$–$C_6$ alkane diol is 1,4-butane diol.

10. The solid organic polymer of claim 1 wherein said organic pyrocarbonate is dialkyl pyrocarbonate in which each alkyl is a $C_1$–$C_{12}$ alkyl.

11. The solid organic polymer of claim 1 wherein said organic pyrocarbonate is diethyl pyrocarbonate.

12. The solid organic polymer of claim 1 wherein said triphenyl phosphite is present in an amount in the range of from about 0.05 to about 0.4 percent by weight.

13. The solid organic polymer of claim 1 wherein said triphenyl phosphite is present in an amount in the range of from about 0.1 to about 0.3 percent by weight.

14. The solid organic polymer of claim 1 wherein:

(a) said poly(allyl carbonate)-functional material is polyol(allyl carbonate) monomer;

(b) said vicinally aliphatic polyurethane comprises terminally unsaturated polyurethane represented by at least one of the formulae:

D—B—A—B—D

D—B—A—B—D' wherein D represents the terminal functional group containing allyl unsaturation, D' represents the terminal functional group containing acrylyl unsaturation, B is represented by the formula:

—OC(O)—NH(E)NH—C(O)—O— wherein E is the vicinally aliphatic residue of a vicinally aliphatic diisocyanate, and A represents the residue of a saturated aliphatic diol selected from the group consisting of poly(caprolactone) diol having a molecular weight of from about 400 to about 1000 and 1,4-butane diol; and (c) said organic pyrocarbonate is dialkyl pyrocarbonate in which each alkyl is a $C_1$–$C_{12}$ alkyl.

15. The solid organic polymer of claim 14 wherein:

(a) said polyol(allyl carbonate) monomer is diethylene glycol bis(allyl carbonate) monomer; and (b) said dialkyl pyrocarbonate is diethyl pyrocarbonate.

16. The solid organic polymer of claim 1 which contains a photochromic amount of an organic photo chromic substance selected from the group consisting of spiro(indolino)naphthoxazines, spiro(indolino)pyridobenzoxazines, spiro(indolino)benzoxazines, spiro(indolino)benzopyrans, spiro(indolino)naphthopyrans, chromenes, spiro(benzindolino)pyridobenzoxazines, spiro(benzindolino)naphthoxazines, spiro(benzindolino)naphthopyrans, metal dithizonates, fulgides, fulgimides, spiro(di)hydroindolizines, and mixtures of such photochromic substances.

17. The solid organic polymer of claim 16 wherein the photochromic substance is selected from the group consisting of spiro(indolino)naphthoxazines, spiro(indolino)pyridobenzoxazines, spiro(indolino)benzoxazines, chromemes, and mixtures of such photochromic substances.

* * * * *